United States Patent [19]
Wiser et al.

[11] Patent Number: 5,227,187
[45] Date of Patent: Jul. 13, 1993

[54] DRIED CHEESE PRODUCT AND METHOD FOR MAKING SAME

[75] Inventors: Julie A. Wiser; Stuart J. Terhune; Bud E. Gilmartin, Jr.; Judith A. Kintner, all of Spokane, Wash.

[73] Assignee: Commercial Creamery Co., Spokane, Wash.

[21] Appl. No.: 717,205

[22] Filed: Jun. 17, 1991

[51] Int. Cl.$^5$ .............................................. A23C 1/03
[52] U.S. Cl. .................................. 426/582; 426/491; 426/522; 99/453; 99/483
[58] Field of Search .................. 426/491, 522, 582; 99/453, 483

[56] References Cited
U.S. PATENT DOCUMENTS

| | | | |
|---|---|---|---|
| 2,289,576 | 7/1942 | Jordan et al. | 426/582 |
| 3,573,930 | 4/1971 | Dale | 426/582 |
| 5,068,118 | 11/1991 | Strandholm | 426/582 |

OTHER PUBLICATIONS

Kosikowsky, F. 1966. Cheese and Fermented Milk Foods. Published by the author, Dept. of Food Science, Cornell University, Ithaca, N.Y. p. 295.

Hawley, G. 1981, The Condensed Chemical Dictionary, 10th Ed. Van Nostrand Reinhold Co., N.Y. pp. 704, 986.

*Primary Examiner*—Jeanette Hunter
*Assistant Examiner*—Helen Pratt
*Attorney, Agent, or Firm*—Seed & Berry

[57] ABSTRACT

There is disclosed a dried cheese product which resists burning when exposed to high processing temperatures. The dried cheese product is manufactured by passing a homogenized cheese emulsion through the nip gap of a roller dryer to form at least one sheet of the dried cheese product. The homogenized cheese emulsion includes cheese, an emulsifying agent, a surface-active agent and water.

10 Claims, 1 Drawing Sheet

DRIED CHEESE PRODUCT AND METHOD FOR MAKING SAME

TECHNICAL FIELD

The present invention relates generally to a dried cheese product and to a method for making the same, and more specifically, to a dried cheese powder that resists burning when exposed to high processing temperatures.

BACKGROUND OF THE INVENTION

Dried cheese powders are often used in food products to avoid the microbiological problems normally associated with the moisture content of cheese. Moreover, dried cheese powders are easier to handle than bulk cheese, and do not require refrigeration.

The primary disadvantage associated with the use of dried cheese powders in food products is that these powders tend to burn when exposed to high processing temperatures. Specifically, dried cheese powders made by conventional spray drying or pan drying techniques burn at temperatures that other food ingredients do not. For example, when a conventionally dried cheese powder is added as a flavoring agent to one-step microwave popcorn (i.e., popcorn where the flavoring agents are present within the bag during popping, rather than added by a subsequent step after popping), the cheese powder will burn due to the very high processing temperatures generated within the bag during popping.

Accordingly, there is a need in the art for a dried cheese product that will resist burning when exposed to high processing temperatures, as well as a process for making such a product.

SUMMARY OF THE INVENTION

Accordingly, it is an object of the present invention to provide a dried cheese product which resists burning when exposed to high processing temperatures. It is a further object of the instant invention to provide a process for the manufacture of such a dried cheese product. Upon further study of the specification and appended claims, additional objects and advantages of this invention will become apparent to those skilled in the art.

Briefly stated, the present invention discloses a method of making a dried cheese product which resists burning when exposed to high processing temperatures. In one embodiment of the instant method, a homogenized cheese emulsion is dried by passing through the nip gap of a roller dryer to form one or more sheets of a dried cheese product. The cheese emulsion includes a mixture of cheese, an emulsifying agent, a surface-active agent and water. Preferably, the sheet of dried cheese product is further milled to yield a dried cheese product having uniform particle size, such as a dried cheese product in powder or granular form.

DETAILED DISCUSSION OF THE INVENTION

Figure 1:
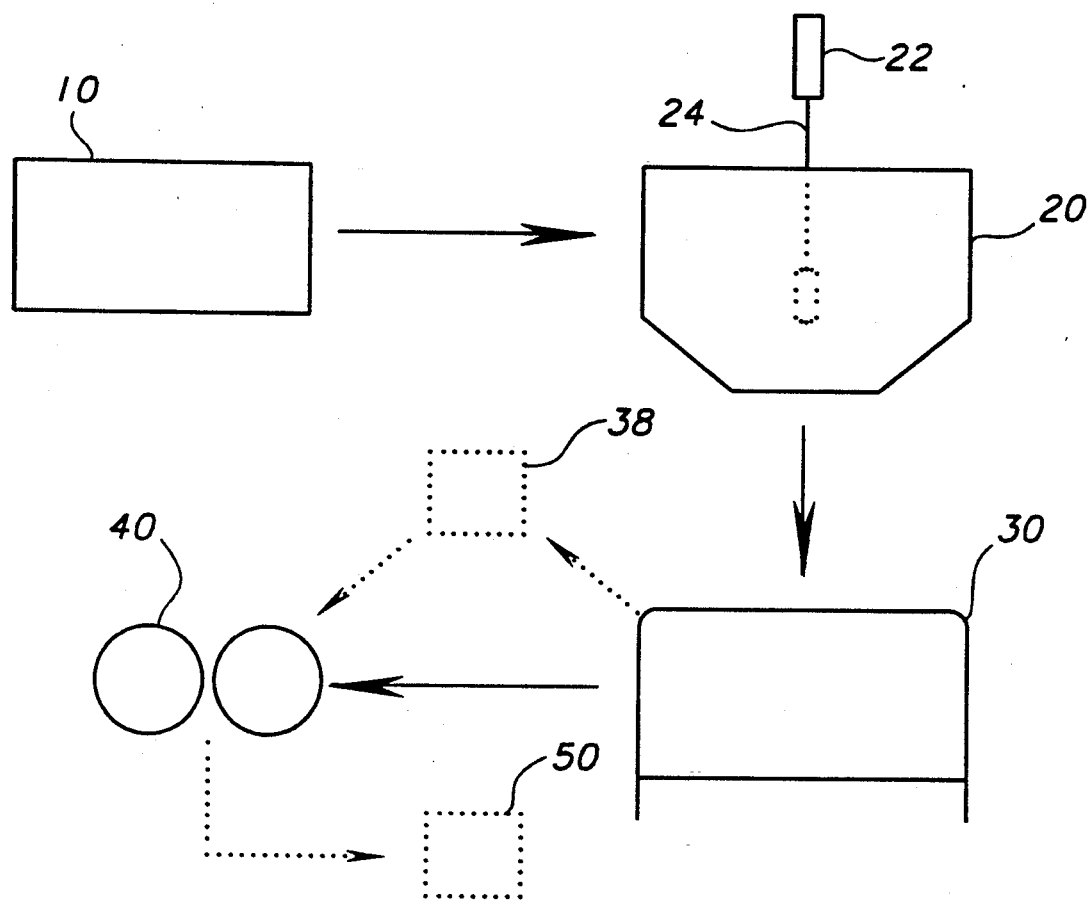
FIG. 1 is a schematic representation of one embodiment of the instant invention illustrating the process steps employed in the manufacture of a dried cheese product.

The present invention discloses a dried cheese product which resists burning when exposed to high processing temperatures. In addition, the instant invention also discloses a method for making a dried cheese product and, by further milling, a dried cheese product in a powder or granular form. The dried cheese powder or granules find use in a variety of food products, including, but not limited to, extruded products such as cheese flavored puffed corn puffs, bakery products such as crackers, cookies and breads, and other food products such as one-step microwave popcorn. In addition, the dried cheese product may be used in food as a substitute for conventionally dried cheese products (e.g., spray dried or pan dried cheese powders), and finds particular use when the food product is exposed to direct heat sufficient to cause conventionally dried cheese products to burn.

In the process of the present invention, a homogenized cheese emulsion is exposed to a drying temperature which is higher than conventional cheese drying techniques. This higher drying temperature results in the denaturation of the proteins within the cheese emulsion. Thus, the amino functional groups of the proteins within the cheese emulsion are no longer available to partake in the Maillard reaction. By use of the roller dryer of the instant invention, the protein content of the cheese emulsion is denatured and dried simultaneously.

The dried cheese product produced by the instant process is also very low in simple sugars which contributes to the non-browning of the product. However, the low sugar content does not preclude the addition of starches and other carbohydrates to the final product since they will only cause the dried cheese product to brown slightly. This characteristic is primarily due to the degree that the protein content of the final product has been denatured, and thus not capable of undergoing the Maillard reaction.

The browning or Maillard reaction is a complicated sequence of chemical changes which occur (without the involvement of enzymes) during heat exposure of foods containing carbohydrates, usually sugars, and proteins. This reaction is responsible for the surface color change of bakery products, and includes an aldol condensation reaction involving the carbonyl groups of the carbohydrates and the amino groups of the proteins. When heated, these compounds produce melanoidins and a host of other compounds which give rise to the golden brown color to bread crusts, cakes and cookies, and the caramel color and flavor to a wide variety of food products.

When the dried cheese product of the instant invention is milled to a powder form, the resulting dried cheese powder is not readily water soluble. Such a characteristic is advantageous in food products where a low water activity is desired, such as food products which require other ingredients to be fully hydrated and foods which are sensitive to competition for water caused by other ingredients (e.g., salad dressings). Furthermore, some foods preferably contain small bits of dried cheese which can be identified by the consumer (e.g., cheese bits on top of crackers). The low solubility of the instant dried cheese product is due, in part, to the loss of hydrogen bonding capacity associated with the denatured protein content, and by the roller dried product being slightly "case hardened" which further slows hydration.

Referring to FIG. 1, one embodiment of the process steps employed in the manufacture of the instant dried cheese product is illustrated. While not required, cheese is preferably ground in cheese grinder 10 to a particle size ranging from approximately ½ inch to ⅛ inch square. An acceptable cheese grinder for this purpose is manufactured by Rietz, Model No. RE-15-K7E328, which has a 25 horse power motor and a grating wheel which rotates at 100 RPM. This optional grating step is preferably employed to reduce the size of the cheese and speed up the subsequent formation of the cheese emulsion.

In the present invention, the cheese may be of any variety of cheese including, but not limited to, Cheddar, Blue (i.e., Roquefort), Romano, American, Mozzarella, Jack, Brick, Brie, Camembert, Dunlop, Dutch, Edam, Gloucester, Gruyere, Limberger, Neufchatel, Parmesan, slipcoat, Stilton, and various mixtures thereof. In addition, the process of the present invention may also be used produce various dried products made from butter, cream, sour cream and a variety of other foods which (like cheese) are predominantly a combination of fat and protein in their normal state.

The cheese is then preferably transferred to a mixing vat 20, having a mixing motor 22 and mixing blade 24. A 500 gallon mixing vat manufactured by Idaho Steel, Model "Bridge Top Mixing Vat", is suitable for this purpose. While in the mixing vat, an emulsifying agent, a surface-active agent and water are added to the cheese. Alternatively, the above components may be combined prior to transfer to the mixing vat.

Water is added to the cheese in an amount sufficient to yield a percent solids content (based upon the dry weight of the components) ranging from about 25% to about 70%, and preferably from about 35% to about 60%, and most preferably from about 40% to about 45%. The amount of water added will vary depending on the solids content of the particular cheese or cheeses employed.

The cheese emulsifying agent of the present invention aids in forming a cheese/water emulsion. Such emulsifiers are generally known and, in the practice of the present invention, are preferably salts of citric or phosphoric acid, including sodium citrate and sodium phosphate. Additional cheese emulsifying agents are specified by W. Berger in "JOHA Emulsifying Salts", B. K. Ladenburg, publisher, January 1984, which is hereby incorporated by reference.

The emulsifying agent is preferably added to the cheese in an amount ranging from 0.25% to 5% dry weigh solids, and the amount added will vary depending upon the type of cheese or cheeses employed. For example, for a dried Cheddar cheese product, the emulsifying agent is preferably added in an amount of about 1.5%. If too little emulsifying agent is added to the cheese the cheese will not emulsify. In contrast, if too much emulsifying agent is added, the final product may exhibit an objectionable flavor imparted by the emulsifying agent.

The surface-active agent of the instant invention serves to stabilize the cheese emulsion and aids in the prevention of "oil-off" during the subsequent drying step. Specifically, the surface-active agent reduces the surface tension between the fat (i.e., oil) and water contained within the cheese emulsion. Preferably, the surface-active agent is a monoglyceride, such as sold under the trade name Myvacet ® (Eastman Kodak). Although monoglycerides are preferred, other surface-active agents may be employed, including, but not limited to, diglycerides, polysorbate, sodium stearoyl-2-lactate (e.g. Emplex ®, C.J. Patterson Company), as well as carbohydrates such as maltodextrins, starches and modified starches suitable as surfactants (e.g., Capsul ®, National Starch), and phospholipids such as lecithin emulsifiers (e.g., Dur-Lec ™, Van Den Bergh).

The surface-active agent is added to the cheese in an amount ranging from about 0.5% to about 10%. The amount of surface active agent will vary depending upon the type of cheese employed. For example, for a dried Cheddar cheese product, it is preferable to add a monoglyceride in an amount of 3.1% dry weight solids content. If too little surface active agent is added, the cheese emulsion will more readily oil-off during drying, and if too much is added, the flavor of the dried cheese product may be objectionable.

Preferably, the pH of the cheese emulsion ranges from 4-7. Below this range, the cheese emulsion may not form, and above this range an objectionable flavor may result in the final dried cheese product.

In addition, to the above emulsifying agent and surface-active agent, various flavoring agents may also be added to the cheese depending upon the desired taste and appearance of the final dried cheese product. For example, a sugar and amino acid (such as dextrose and leucine) may be added to yield a high temperature cheese product having a grilled flavor due to the Maillard browning reaction. Such flavoring agents may be added in an amount which yields the desired taste. For example, when dextrose and leucine are added to Cheddar cheese, adding both the sugar and amino acid in an amount of approximately 0.02% solids dry weight is preferred.

Referring to FIG. 1, the cheese, emulsifying agent, surface-active agent and water are then thoroughly mixed with mixing motor 22 and mixing blade 24 to yield a uniform emulsion. The resulting uniform emulsion is preferably mixed to a consistency suitable for pumping.

The uniform cheese emulsion is then transferred to homogenizer 30 and homogenized to yield a homogenized cheese emulsion. A Model No. K-12, size 12, homogenizer manufactured by Manton Gaulin is suitable form this purpose. This homogenization step serves to mechanically disrupt the oil globules within the uniform emulsion.

In an alternative embodiment, the cheese emulsion may be pasteurized either before or after homogenization. Vat pasteurizing includes heating either the cheese emulsion or homogenized cheese emulsion to a temperature of 140° F. for 20 minutes. Pasteurization serves as a sterilization step and destroys most disease-producing microorganisms which may be contained in the cheese emulsion or homogenized cheese emulsion.

The homogenized cheese emulsion is then transferred to a roller dryer 40 for heat treatment. In an optional embodiment, the cheese emulsion may be fed to a cheese emulsion holding tank 38 prior to transfer to the roller dryer. A suitable holding vat for this purpose is a 600 gallon tank manufactured by Damrow Bros. Co., model type MV.

Figure 2:
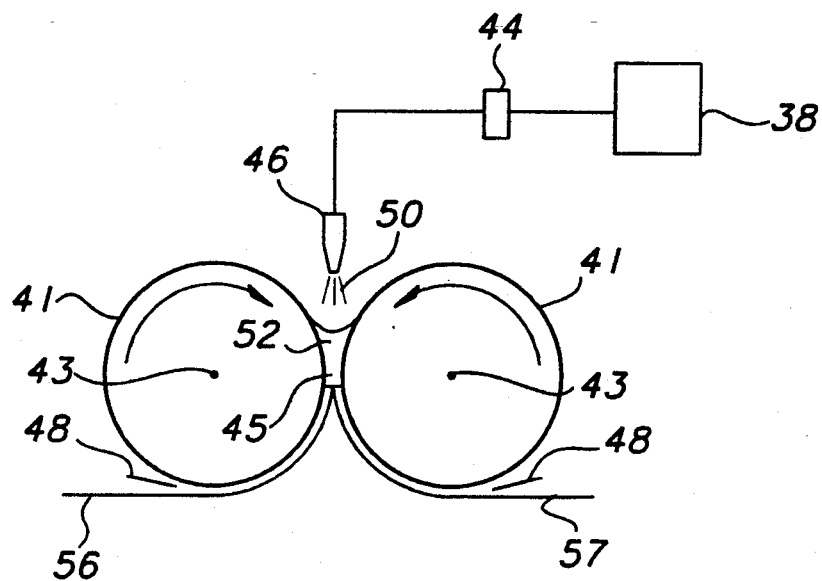
FIG. 2 is a side cross-sectional view of one embodiment of the roller dryer of the instant invention wherein a cheese emulsion is sprayed along the nip gap of roller dryer and two sheets of a dried cheese product are formed.

Referring to FIG. 2, a cross-sectional view of one embodiment of a roller drying of the present invention is illustrated. The roller dryer includes two counter-rotating, heated cylinders 41, which rotate around an axis 43. The cylinders are adjustable positioned to form a nip gap 45 between the surface of each cylinder. The nip gap may be adjusted such that the protein content of the homogenized cheese emulsion, when passing through the nip gap, will be substantially denatured and also be simultaneously dried to form at least one sheet of dried cheese product. Preferably, a Blaw-Knox Double Drum Dryer, 600-Series, Serial No. 701, is used for this step. Moreover, the roller dryer should be approved by the USDA. Alternatively, the roller dryer may be a single roller type apparatus (not shown).

The homogenized cheese emulsion is preferably contained within cheese emulsion holding tank 38, and is feed by pump 44 to spray nozzle 46. A cheese emulsion spray 50 is aimed at the nip gap between the cylinders of the roller dryer. The flow of cheese emulsion is maintained such that a slight well of cheese emulsion 52 is maintained above the nip gap of the two heated cylinders.

The nip gap between the cylinders of the roller dryer, the surface temperature of the cylinders, and the revolution speed of the cylinders are controlled by the operator. Preferably, the nip gap ranges from 0.001 inches to 0.01 inches, the surface temperature of the cylinders ranges from 200° F. to 350° F., and the revolution speed ranges from 5 R.P.M. to 22 R.P.M. More preferably, the nip gap ranges from 0.002 inches to 0.005 inches, the surface temperature of the cylinders ranges from 290° F. to 310° F., and the revolution speed ranges from 10 R.P.M. to 18 R.P.M. The above parameters will vary depending upon the type of cheese used to make the dried cheese product and the make/manufacturer of the roller dryer. The optimum settings for drying a particular homogenized cheese emulsion may readily be determined by conducting trial runs prior to initiating production.

When the homogenized cheese emulsion passes through the nip gap between the heated cylinders, the emulsion dries and forms two sheets of dried cheese product 56 and 57 upon the surface of each cylinder. The sheets of dried cheese product have a thickness equal to approximately ½ the thickness of the nip gap. As the cylinders rotate, the sheets are transported away from the nip and may be removed from the cylinder surface with knife blade 48 which runs tangentially to the surface of the cylinders. Alternatively, if a single roller dryer is employed, one sheet of dried cheese product will be formed.

The sheets of high temperature cheese are collected as they are removed from the surface of the cylinders. Referring again to FIG. 1, the sheets of dried cheese product are then optionally transferred a particle reducing machine 50, such as a CO-Mill or Fitzmill, where it is milled or ground in the desired size. For example, the sheet of high temperature cheese may be milled to a powdered form for use in sauces and gravy, or milled to a granular form for uses in crackers or bread. While milling of the sheets of dried cheese product is not required, such a step serves to produce a product (e.g., powder or granules) containing a standardized particle size. A suitable Co-mill for this purpose is manufactured by Quadro Engineering Inc., Model No. 196S, size 8", with a screen size suitable for obtaining the desired particle size.

In the process of the instant invention, it is important to control the rate at which the cheese emulsion is sprayed at the nip of the cylinders such that the well of cheese emulsion is kept to a minimal depth. If the well of cheese emulsion is too deep, the water content of the cheese emulsion will evaporate, causing the emulsion to break (i.e., the oil will separate). If this happens, the cheese emulsion will not dry as it passes through the nip gap of the dryer roller. In addition, it is important to control the temperature of the cylinders to avoid temperature fluctuations along the surface of the cylinders.

Moreover, if the cheese emulsion is not homogenized, the emulsion will break when subject to the heat of the cylinders, causing the fat content of the cheese emulsion to drip off the drums. Similarly, if the surface temperature of the cylinders is too hot, or the cylinder revolution is too slow, the emulsion will break causing the oil to separate from the cheese emulsion. This will result in the cheese emulsion not drying when passed through the nip gap, and the sheet of cheese product will roll up on the knife blade rather than being cleanly removed from the surface of the cylinders. Moreover, if the nip gap is too large, the cylinder rotation too fast, or the solids content too low, the product will again not dry and will roll up on the knife blade.

In contrast, if the nip gap is too small, and insufficient cheese emulsion is being passed through the nip, there will not be an even coating on the cylinders. This will result in the surface of the cylinders not being uniformly covered which causes the dried cheese product to come off the drums in flakes rather than an even sheet which is preferred for product uniformity, flavor, and production efficiency.

Accordingly, it is important that the operator closely control the surface temperature of the heated cylinders, the cylinder revolution speed, the nip gap, the cheese emulsion percent solids content, and the well depth of cheese emulsion above the nip gap during manufacture of the dried cheese product. While these parameters preferably fall within the ranges identified hereinabove, one skilled in the art can readily determine the optimum parameters for the specific processing ingredients and machinery employed.

Although the method of the present invention has been described above as a batch process, the steps may also be performed in a continuous manner.

From the foregoing description, one skilled in the art can easily ascertain the essential characteristics of this invention, and without departing from the spirit and scope thereof, can make various changes and modifications of the invention to adapt it to various usages and conditions. Such modifications and variations are intended to come within the scope of the appended claims.

We claim:

1. A method for making a dried cheese product, comprising:
    drying a homogenized cheese emulsion by passing said cheese emulsion through the nip gap of a roller dryer to form at least one sheet of the dried cheese product, wherein said cheese emulsion is a cheese and water mixture having a dry weight solids content ranging from 25% to 70% and comprising cheese, an emulsifying agent in an amount ranging from 0.25-5% by weight, a surface active agent in an amount ranging from 0.5-10% by weight and water, and wherein said cheese emulsion upon passing through the nip gap of the roller dryer is subject to a cylinder surface drying temperature ranging from 200° F. to 350° F. to form said sheet of dried cheese product.

2. The method of claim 1 wherein said sheet of dried cheese product is further milled to a uniform particle size.

3. The method of claim 1 wherein said cheese emulsion further comprises one or more flavoring agents.

4. The method of claim 1 wherein said cheese emulsion has a dry weight solids content ranging from 35% to 60%.

5. The method of claim 1 wherein said cheese emulsion has a dry weight solids content ranging from 40% to 45%.

6. The method of claim 1 wherein said emulsifying agent is a salt of citric or phosphoric acid.

7. The method of claim 1 wherein said emulsifying agent is sodium citrate or sodium phosphate.

8. The method of claim 1 wherein said surface-active agent is a mono- or di-glyceride.

9. A dried cheese product made by the method of claim 1.

10. A dried cheese product made by the method of claim 2.

* * * * *